Nov. 8, 1938.  P. M. BOURDON  2,136,038
DEVICE FOR INDICATING DEFLATION OF PNEUMATIC TIRES
Filed May 6, 1937  2 Sheets-Sheet 2

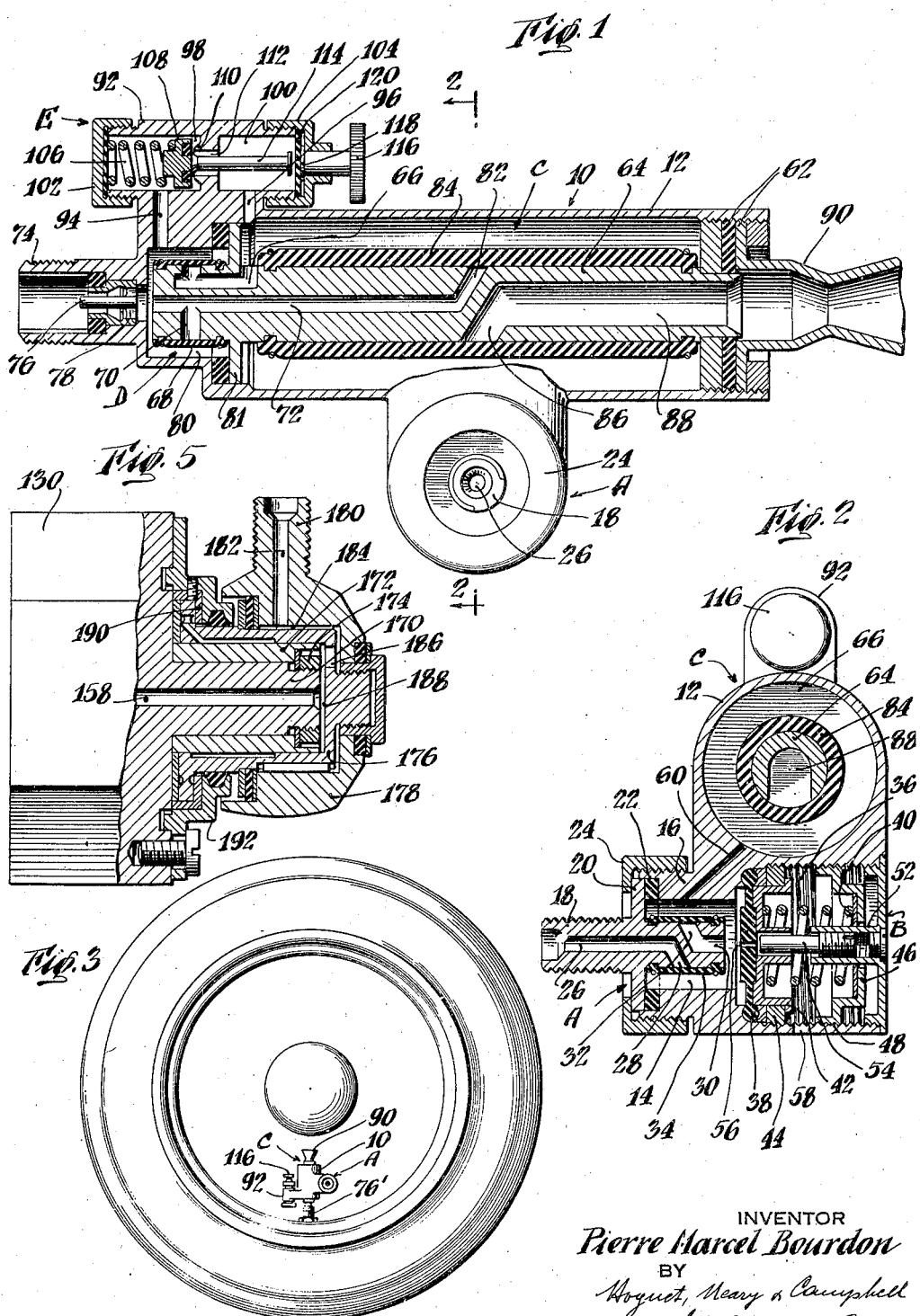

INVENTOR
*Pierre Marcel Bourdon*
BY
ATTORNEYS

Patented Nov. 8, 1938

2,136,038

UNITED STATES PATENT OFFICE 2,136,038

DEVICE FOR INDICATING DEFLATION OF PNEUMATIC TIRES

Pierre Marcel Bourdon, Paris, France, assignor to Michelin & Cie, Clermont-Ferrand, France, a corporation of France Application May 6, 1937, Serial No. 141,027
In France May 7, 1936

12 Claims. (Cl. 116—34)

This invention relates to devices for automatically indicating when the air pressure in a pneumatic tire falls below a predetermined minimum.

As is well known, tires may be seriously damaged by running them below their optimum pressure as well as continuing to run on punctured tires while they are deflating. In a vehicle having but a single tire to the wheel, a reduction below the best operating pressure will cause unnecessary flexing of the tire casing, resulting in side wall cuts and breaks and cracking and separating of the plies in the tire, thereby greatly reducing its mileage life.

Truck tires likewise are subject to deterioration upon reduction of pressure below their optimum operating pressures. In addition, when a plurality of tires are used on a single wheel they are subject to blowing out when loss of pressure in one of the tires places a greater load on the other tires.

An object of the present invention is to provide a device or a plurality of such devices to be connected to tires during service and which give an unmistakable warning when the pressure decreases in the tires.

A further object of the invention is to provide a device which may be installed on a vehicle wheel and connected to a tire tube and which acts, upon deflation or partial deflation of the tube, to give an audible warning.

A still further object of the invention is to provide a warning device which may be used in conjunction with multiple tire wheels serving both as a connecting means between the tubes for equalizing the pressures therein when above a predetermined minimum pressure and giving a warning signal when the pressure in any of said tires decreases sufficiently to exceed a predetermined differential in pressure.

One form of the invention may consist of a housing containing elements connectible to the valve stem of an inner tube and having a similar stem which may be connected to the ordinary air dispensing device for filling or inflating the tires. Between these two connections may be a plurality of diaphragm type valves which normally prevent flow of air from the tube outwardly through the filling stem. The valves are so constructed and arranged that they direct outwardly flowing air to a sound making device when the pressures on the valves are decreased below a predetermined amount.

More specifically, one form of the invention may include an air inlet stem having a diaphragm valve which may be subjected to external and internal pressure upon inflation of the tire to allow air to flow in but one direction therethrough. Associated with this valve is a similar valve having a diaphragm through which air may be passed from the inlet stem to the inner tube and which acts under normal conditions as a check valve preventing return of air from the inner tube to the inlet stem and the valve associated therewith. The diaphgram valves are so related in the device that when pressures exerted by the air in the tire falls below a predetermined minimum, the air is by-passed to a sound making device consisting of a vibratable diaphragm valve and thence to a horn for rendering the sound impulses audible.

One of these devices may be used in conjunction with each tire on a motor or other vehicle having pneumatic tires and likewise they may be connected in parallel when used with multiple tire wheels in order to indicate when one of the tires is partially deflated.

Suitable means may also be provided for connecting the parallelly arranged sound making devices between the multiple tires so that the pressures therein are equalized and tending to retain them in equilibrium so long as the pressure in one does not fall below a predetermined minimum pressure.

Devices embodying my invention may be mounted either directly on the valve stem for rotation with the wheel or they may be mounted at the center of the wheel and connected through suitable means to a sound making device carried on the interior of the car so that the driver will hear the warning signal. This last construction is particularly suitable for use with trucks which cause a great deal of noise and also with passenger vehicles having sound insulated bodies.

For a better understanding of the present invention, reference may be had to the accompanying drawings in which:

Figure 1 is a side view of one form of a device embodying the invention suitable for attachment directly to the valve stem of an inner tube and rotatable with the wheel, the device being shown partly in section to show the details thereof;

Figure 2 is a sectional view taken on line 2—2 of Figure 1;

Figure 3 is a side view of a vehicle wheel and tire showing the form of invention disclosed in Figure 1 attached to the valve stem of the inner tube;

Figure 5 is a side view partly in section of a portion of the device disclosed in Figure 4.

Figure 4:
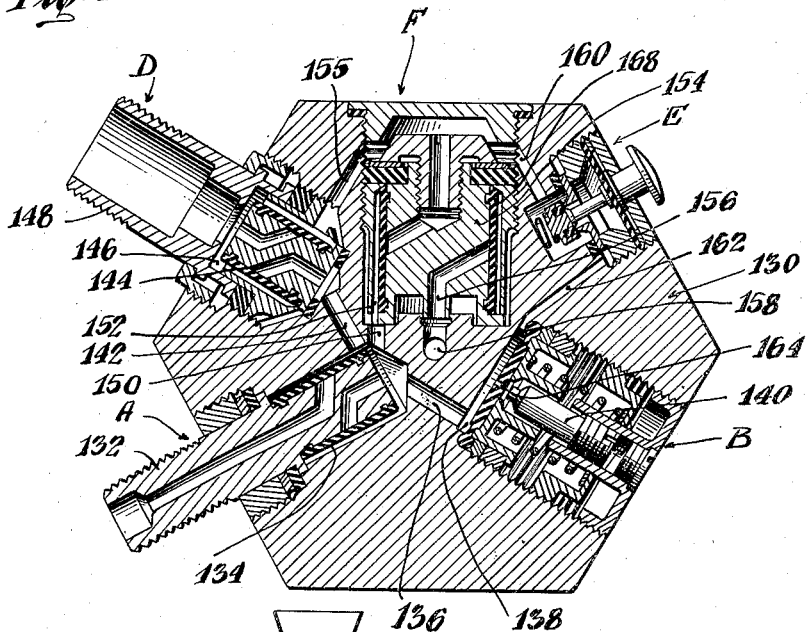
Figure 4 is a sectional view of a modified form of the invention of a type suitable for mounting at the center of the wheel.

Illustrative of one form of the invention, Figures 1, 2 and 3 disclose a warning signal device 10, attachable to the valve stem of a pneumatic tire as best shown in Figure 3. The warning signal 10 consists of several associated elements including: an air inlet valve and chamber construction A; an air escape valve B; a sounding device C; an air outlet valve and chamber D connectible to a valve stem; and a setting device E. The several devices A, B, C, D and E are connected through and mounted on a cylindrical casing 12. The air inlet valve A is mounted in bore 14 of the laterally projecting housing 16. The housing 16 forms the chamber for the air inlet mechanism A which consists of a stem 18 having a disc-like collar 20 thereon. The collar 20 is retained against a gasket 22 mounted at one end of the bore 14 in airtight relation by means of an internally threaded collar 24.

The stem 18 communicates with the bore 14 through an inlet passage 26 having an angular extension 28 opening to the exterior of the stem. The stem is also provided with an axial bore 30 having an angular passage 32 communicating with the exterior of the tube opposite the opening 28.

A diaphragm consisting of a rubber sleeve 34 is slipped over the inner end of the stem 18 and clamped in any suitable manner around the stem at points spaced from the outlets 28 and 32. When air is forced into the stem from the air hose of an air supply, the diaphragm sleeve 34 is stretched allowing air to pass around the stem from outlet 28 into lateral bore 32 and thence out of the bore 30 into the chamber formed by the transverse bore 14.

The above described construction forms the air inlet device A.

At the opposite end of the bore 14 is a chamber 36 of greater diameter in which is mounted a rubber disc diaphragm 38 normally urged in the direction of the inlet stem 18 by means of a spring 40 acting against the cup-shaped sleeve 42 slidably mounted in annular gaskets 44 fixed in the enlarged portion of the bore 36, and retaining the edges of the diaphragm 38 in position in the housing 16. The cup-shaped sleeve 42 bears against the diaphragm 38 and normally holds it in plane condition. The tension on the spring 40 may be adjusted by means of a cup-shaped member 46 opening toward the diaphragm and having threads 48 on its edges engaging similar threads on the interior walls of the chamber 36 to allow it to be adjusted towards and from the diaphragm.

The right-hand end of the chamber 36 may be closed by means of a cap having a threaded rim and also having a centrally located cylindrical sleeve 52 in which is received a threaded rod 54, the end of the rod normally being spaced slightly from the diaphragm 38. The diaphragm 38 is also provided with a central perforation 56 in alignment with the rod 54, which acts in conjunction with the end of the rod as a valve preventing flow of air therethrough when the pressure on the inlet side of the diaphragm becomes sufficiently great, and opening to allow escape of air when the pressure in the chamber 14 decreases to a predetermined value. Communicating with the chamber 36 between the cup-shaped elements 46, 42 is an outlet 58 through which air may be exhausted to atmosphere.

The above described construction forms the air escape valve and chamber B.

In operation, when air is forced through the inlet nozzle 18, it passes along the passage 26, expands the diaphragm 34 and passes out through the outlet 30 increasing the pressure in the chamber between the diaphragm 38 and the nozzle 18. Air will leak out through aperture 56 in the disc diaphragm 38 until the pressure in the chamber reaches a predetermined value. The diaphragm 38 will be then forced against the end of the rod 54, closing the aperture 56. Air will then pass from the bore 14 through the passageway 60 into the cylinder 12, building up the pressure therein.

The cylindrical member 12 is closed at its right-hand end as viewed in Figure 1, by means of suitable locking rings and gaskets 62 which also support a centrally located tube 64 and diaphragm hereinafter described, forming the sound making device C.

As the air passes into the cylinder 12, the pressure therein will build up and the air escapes through passageway 66 in the tube 64 under the rubber diaphragm 68 and into the passage 70 and thence through the bore 72 to the connection 74 which may be threaded into the valve stem of an inner tube, this construction forming the outlet valve D.

The valve D may be provided with a fixed concentric rod 76 mounted on a spider 78 disposed in the connection 74 for depressing the valve stem in an inner tube to allow direct communication between the inner tube and the chamber 80 surrounding the diaphragm 68 formed in a reduced extension of cylinder 12 and separated therefrom by a partition 81. There is no direct communication between the chamber 80 and the interior of cylinder 12 except through passages 66, 70 and 72, so that the pressure in the chamber 80 will be substantially equal to the pressure in the tire and normally slightly less than the pressure in cylinder 12. The passage 72 in the tube 64 is provided with a laterally opening portion 82 which is normally closed by a heavy rubber diaphragm 84 encircling the tube 64. An inclined passageway 86 of larger cross-sectional area communicates with an axial bore 88 opening into a horn 90 fixed in the end of cylinder 12 through which the warning signal is given. When the tire tube is fully inflated, the chamber between cylinder 12 and tube 64, the chamber 14 between the diaphragm 38 and the inlet stem 18 and the tube contain air at substantially equal pressures.

When the pressure in the inner tube decreases, the pressure in chamber 80 likewise decreases. The pressure in the cylinder 12 therefore is greater than the pressure in chamber 80 and will tend to distend the diaphragm 68 to allow air to pass from the cylinder 12 into the chamber 80; when the pressure in the cylinder 12 drops sufficiently, the pressure in chamber 14 will likewise drop and allow the diaphragm 38 to move away from the rod 54, permitting the air in the cylinder 12 and chamber 14 to escape through the outlet 58 to atmosphere. When the pressure in cylinder 12 drops sufficiently, the pressure in the tire tube will be sufficient to act through passage 72 to expand the diaphragm 84. The air from the inner tube will pass around the tube 64 and exhaust through the passageways 86 and 88. Since these passages are of greater diameter than the passage 72, they will more quickly exhaust the air than passage 72 can supply it, and the diaphragm will again seal the openings, giving a sound impulse. This expansion and contraction of the diaphragm will take place at audible frequency vibrating the column of air in passage 88 and producing a sound so long as the pressure in the tire tube and passage 72 and 82 is sufficient to expand the diaphragm. The duration of the period of vibration of the diaphragm may amount to about thirty seconds after which the diaphragm 84 will seal the passage 82 and no further deflation of the tire can take place through the sound making apparatus.

When it is desired to replace the tire, the device 10 may be unscrewed from the valve stem of the deflated tire, the deflated tire removed, an inflated tire placed on the wheel and the sound making device again screwed into the valve stem. However, the pressure in the warning device at this stage is not in equilibrium with the pressure in the tire. The pressure in the tire tube is greater than the air pressure in cylinder 12, thereby allowing the diaphragm 84 of the sound making device C to vibrate, and also allowing leakage of air from the tire. To prevent leakage of air from the tire, the setting device E is used during attachment of the device 10 to the tire. The setting device consists of a small housing 92 fixed to the cylinder 12 and having passages 94 and 96 communicating with the chamber 80 and the interior of the cylinder 12 respectively. These passages 94 and 96 communicate with longitudinal chambers 98 and 100 respectively in the casing 92 and having their outer ends closed by means of suitable threaded caps 102 and 104. The chamber 98 encloses a spring 106 normally urging a valve 108 into engagement with a valve seat 110 on a partition between the chambers 98 and 100. The partition is provided with an aperture 112 through which passes the stem 114 of the valve 108 with sufficient clearance to permit passage of air therethrough. The valve is actuated by means of a button 116 mounted slidably in the cap 104 and having disc-end 118 thereon bearing against an air-tight rubber diaphragm 120 between the valve stem 114 and the push button disc 118. When the button 116 is pushed to the left, as viewed in Figure 1, the valve stem is pushed to the left against the spring 106, unseating the valve 108 allowing air in the tire tube to flow through passage 94, chamber 98, chamber 100 and passage 96 into the cylinder 12, bore 14 and closing the diaphragm valve 38, thereby equalizing the pressures throughout the device and setting it for future operation when and if the tire should become deflated.

Another form of the invention which may be permanently mounted on the wheel to form a part thereof, is disclosed in Figures 4 and 5. This construction is similar in its method of operation to that described, but instead of being mounted on the valve stem is supported at the end of the axle or replaces a hub cap and is used when it is desired to place in the interior of the car the sound making device which, if desired, may be replaced by any suitable warning device operable by the compressed air escaping from the inner tube. In this construction, the inlet valve A, the air escape valve B, the air outlet valve D, the setting device E, and a valve F cutting off the sound making device C or other warning device operable by compressed air and placed in the interior of the car, are mounted in a hexagonal casing 130. In this form of the invention, the valve inlet stem 132 is provided with a rubber diaphragm valve 134 and communicates through passage 136 with chamber 138 in which the air escape valve B is mounted.

The inlet nozzle 132 also communicates through passage 142 with the diaphragm valve 144 of the air outlet valve D mounted in a chamber 146 in communication with the outlet nozzle 148 which may be connected through a suitable tube to the valve stem. The inlet 132 also communicates through passage 150 with a chamber 152 containing the diaphragm valve 154 of the cut off valve F. The chamber 146 of the device D communicates with the passages in valve 154 through passage 155. The outlet passage 156 of the valve F communicates with an axial bore or passage 158 connected through suitable tubing to the sound making device or other warning device placed in the interior of the car. Also communicating with chamber 138 of air escape valve B and the chamber 152 of the cut off valve F through passages 160 and 162 is the setting device E.

In this construction, when it is desired to fill a tire, air is forced through the inlet nozzle 132 through the diaphragm valve 134 to the air exhaust valve chamber 138 where the air can escape through the aperture 164 in diaphragm 140 to atmosphere until a sufficient pressure is built up in the chamber 138 to cause closing of the aperture 164. The air then passes through passageway 142 through the diaphragm valve 144 in the chamber 146 and through nozzle 148 and suitable tubing having means for depressing a valve in a valve stem to the inner tube, inflating it. Likewise, air passes through a passageway 150 into the chamber 152 to equalize the pressures on opposite sides of diaphragm 168 of cut off valve F.

Upon leakage of air from the inner tube and a consequent decrease in pressure in chamber 146, air will pass from the chamber 152 around the diaphragm valve toward the tire until the pressure in chamber 152, passage 142 and disc diaphragm chamber 138 decreases sufficiently for the aperture 164 to be opened, whereupon air will escape from the chamber 152 of valve F to atmosphere. The air from the inner tube will then pass through chamber 146 through passageway 155 into the axial passages in valve F and then through axial bore 158 to a warning device which may be a noise making device similar to device C described in connection with Figure 1. The air escaping from the inner tube through valve 144, valve F and axial bore 158 is transmitted to the noise making device or other warning device in the interior of the car through a suitable construction such as that shown in Figure 5 connecting the vehicle body and the rotating wheel.

As shown in Figure 5, the passage 158 extends through a tubular extension 170 having a bearing sleeve 172 retained thereon by a locknut and washer 174. Rotatably mounted on the bearing sleeve 172 is a cup-shaped sleeve 176 carrying at its outer end in fixed relationship thereto, a housing 178 having a stem 180 thereon which may be connected through suitable tubing to a horn in the interior of the vehicle. The housing 178 is provided with a passage 182 communicating with a chamber 184 between the sleeve 176 and the housing 178. Sleeve 176 is provided with a passageway 186 therethrough communicating with a chamber 188 between the end of sleeve 176 and the end of the tubular extension 170. The chamber 188 is thus in communication with the passageway 158, so that the sound impulses may pass from the passageway 158 through chamber 188, passage 186, chamber 184, to the passage 182 of the housing member.

The sleeve 176 is rotatable on the bearing sleeve 172 and is retained in airtight and oiltight relationship thereto by means of suitable gaskets 190 and a ring flange 192 fixed to the end of the housing member 130. This construction permits ready rotation of the housing 130 with the wheel while allowing the housing 180 to be stationarily connected to the sound making device in the interior of the vehicle.

Figure 6:
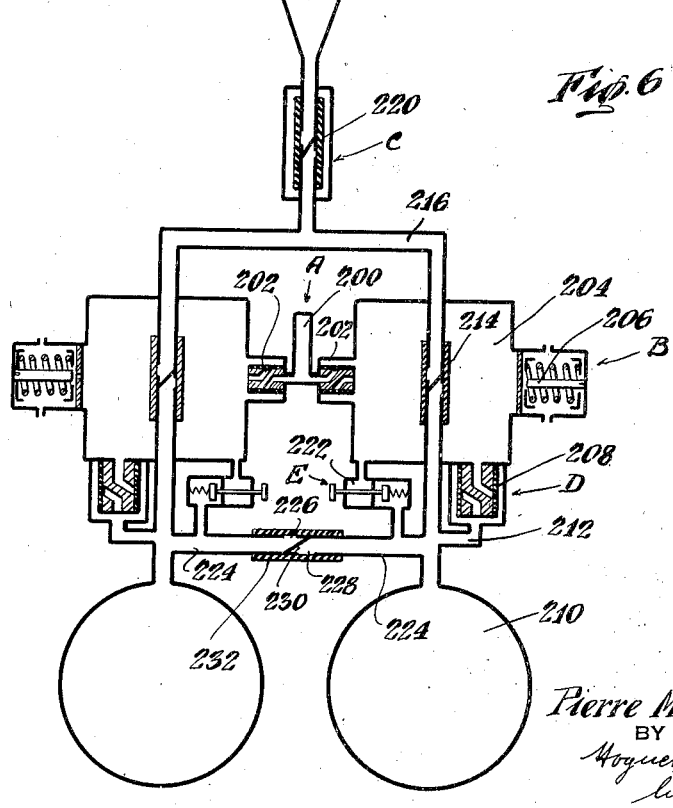
Figure 6 is a diagrammatic showing of one form of the invention as applied to multiple tire wheels.

Constructions similar to those above described may also be utilized in conjunction with multiple tire wheels, as best shown in Figure 6. This construction includes the air inlet stem 200 of air inlet device A connected through diaphragm valves 202 to pressure chambers, only one of which will be described since they are identical, and a sound making device. The diaphragm valve 202 communicates with the chamber 204 having at one side the disc diaphragm valve 206 of air escape valve B through which the air may temporarily escape until pressure builds up in the chamber 204. The air in chamber 204, upon closing the diaphragm valve 206, will pass through the diaphragm valve 208 of air outlet device D into the tire 210 through the passageways 212. The valve stem of the tire 210 is also in direct communication with the diaphragm valve 214 in the pressure chamber 204 and has one branch 216 thereof communicating with the sound making device 220, corresponding to a sound making device C of the type above described.

Also, a setting device 222 above described, communicates directly with the tire tube 210 and the chamber 204.

In order to equalize the pressure between the two tires, branch pipes are provided connecting the interiors of the tires 210. These branch pipes 224 have lateral orifices 226 and 228 and their ends are separated by a partition 230. A relatively non-resilient diaphragm 232 normally seals the orifices 226 and 228 but is expansible when sufficient pressure is exerted through one of the pipes 224. The resiliency of the diaphragm 232 determines the minimum pressure which will remain in either of the tires if one of them should become deflated. By increasing or decreasing the resilience of the diaphragm 232, it is possible to allow communication between the tires when the pressure in both is above a predetermined minimum value, and also to seal one tire from the other when the pressures in both decrease to such an extent that the diaphragm closes the orifices 226 and/or 228.

With the above construction, if one of the tires deflates, air can leak through diaphragm valve 208 from chamber 204 until the disc diaphragm valve 206 opens, whereupon the chamber 204 will lose its pressure and the air can pass directly from the partially deflated tire to the sound making device 220, thereby indicating that one of the tires is deflated.

The setting devices 222 are used when it is desired to replace a deflated tire with an inflated one in the manner described above.

It will be understood that the device disclosed in Figures 1 and 2 may be used in conjunction with one or more tires when connected in parallel in the manner disclosed in Figure 6 and likewise the form of the device disclosed in Figures 4 and 5 may with equal facility be used for multiple tire wheels.

It will also be understood that there may be many modifications made in the specific construction of the preferred forms of these devices without departing from the invention. Therefore, the modifications given should be considered illustrative and not as limiting the scope of the invention as defined in the following claims.

I claim:

1. In a signalling device for indicating the deflation of pneumatic tires, the combination of an air inlet valve, an air outlet valve, separate chambers surrounding said valves, warning means comprising a vibratory diaphragm, a chamber surrounding said diaphragm and communicating with the air inlet and air outlet chambers, said outlet valve allowing flow of air from said warning device chamber to said air outlet valve chamber only, means for allowing escape of air from said warning means chamber when the pressure in said chamber drops below a predetermined minimum, and a member having therein two passageways of different cross-sectional areas cooperating with said diaphragm and communicating with the air outlet valve chamber for allowing passage of air from the tire tube to vibrate said diaphragm when the pressure in said warning device chamber drops below the pressure in the air outlet chamber.

2. The signalling device set forth in claim 1, comprising an auxiliary chamber communicating with the air outlet chamber and the warning means chamber, and a manually operable valve in said auxiliary chamber allowing air to flow from the air outlet chamber to said warning means chamber.

3. In a signalling device for indicating deflation of pneumatic tires, the combination of a sounding device comprising a chamber and a vibratory diaphragm in said chamber, means connecting the interior of the chamber to the interior of a tire tube to allow gas to pass only from said chamber to said tire tube and for normally maintaining the gas pressure in the chamber at least as great as the pressure in the tire tube, means for decreasing the pressure in the chamber to less than the pressure in the tire tube when the pressure in the latter falls below a predetermined minimum, and a member having passageways of different cross-sectional area cooperating with said diaphragm and communicating with the tire tube to deliver gas to vibrate said diaphragm when the pressure in the chamber is so decreased.

4. The signalling device set forth in claim 3, in which the means for decreasing the pressure in the chamber comprises a perforate diaphragm and means for closing the perforation when the gas pressure on the perforate diaphragm exceeds a predetermined minimum.

5. The signalling device set forth in claim 3, comprising a member having a passageway connecting the tire tube with the chamber, and a valve manually operable to allow gas to pass from said tube to said chamber.

6. The signalling device set forth in claim 3, comprising a stationary horn, and means communicating with the vibratory diaphragm to deliver the vibrations to said horn to produce a sound.

7. In a signalling device for indicating deflation of pneumatic tires, the combination of a warning device comprising a chamber and a vibratory diaphragm having one surface exposed in said chamber, means for delivering gas under pressure to said chamber and to a tire tube, a member having a first passageway for delivering gas from the tire tube against another surface of said diaphragm and a second passageway of greater cross-sectional area for exhausting the gas delivered by the first passageway, the gas pressure in the chamber being normally at least as great as the gas pressure in the tire tube and retaining the diaphragm static, means for decreasing the pressure in the chamber to less than the pressure in the tire tube when the pressure in the latter falls below a predetermined minimum to allow the gas to pass through the said first and second passageways and vibrate the diaphragm.

8. The signalling device set forth in claim 7, including a setting device for equalizing the pressures in the chamber and the tire tube comprising a member having a passageway therein communicating with the tire tube and the chamber and a manually actuated valve in said member normally closing said passageway.

9. In combination with a vehicle having multiple tire wheels, a signalling device comprising a vibratory diaphragm, a member having therein a first passage delivering air under pressure against said diaphragm, and a second passage of larger cross-section than the first passage for allowing escape of air delivered against the diaphragm whereby flow of air from the first passage into the second passage will cause the diaphragm to vibrate, and pressure controlled valves connecting the sounding device to the tire tubes, whereby decrease in pressure of the gas in any of said tubes will open the associated valve to deliver air through the first passageway to vibrate said diaphragm at audible frequency.

10. The combination set forth in claim 9, comprising a conduit connecting the tubes, a pressure controlled valve in said conduit operable by the gas pressure in the tubes to allow communication between the tubes while the pressures in the tubes are maintained within a predetermined differential range of pressures.

11. In combination with a vehicle having multiple tire wheels, a signalling device comprising a vibratory diaphragm, a member having therein a first passageway for delivering gas under pressure to said diaphragm, and a second larger passageway allowing escape of the air delivered against the diaphragm through the first passageway whereby flow of air from the first passageway into the second passageway will cause the diaphragm to vibrate, a separate chamber communicating with each associated tire tube, a diaphragm valve in the chamber communicating with the first passageway and the associated tube, the pressure in the chamber and the tube normally maintaining said valve closed and means for exhausting gas from said chamber when the pressure in the tube falls below a predetermined minimum, said valve opening when the gas exhausts from said chamber, whereby gas will flow from said associated tire tube through said valve to the diaphragm to vibrate it at audible frequency.

12. The combination set forth in claim 11, comprising a member having a passage therein connecting each chamber with its associated tire tube, and a manually actuated valve communicating with the chamber and said passage for allowing gas to flow from said tube to said chamber.

PIERRE MARCEL BOURDON.